(12) United States Patent
Reimer (10) Patent No.: US 6,415,209 B1
(45) Date of Patent: Jul. 2, 2002

(54) MARINE ACCESSORY SYSTEMS (75) Inventor: Lawrence B. Reimer, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 09/562,662

(22) Filed: May 2, 2000

(51) Int. Cl.[7] .............................................. G01C 21/10
(52) U.S. Cl. .............................. 701/21; 701/36; 701/28
(58) Field of Search ............................... 701/21–29, 30, 701/36; 440/113, 183 R, 2; 114/125, 286

(56) References Cited

U.S. PATENT DOCUMENTS

| | | | |
|---|---|---|---|
| 3,858,217 A | * 12/1974 | Roll et al. | ................... 343/103 |
| 4,737,770 A | 4/1988 | Brunius et al. | |
| 4,855,713 A | 8/1989 | Brunius | |
| 5,642,295 A | * 6/1997 | Smayling | ..................... 702/182 |
| 5,742,920 A | * 4/1998 | Cannuscio et al. | ......... 701/102 |
| 5,809,437 A | * 9/1998 | Breed | ........................... 701/29 |
| 5,935,180 A | * 8/1999 | Fieramosca et al. | .......... 701/29 |
| 5,950,144 A | * 9/1999 | Hall et al. | ................... 702/108 |
| 5,950,147 A | * 9/1999 | Sarangapani et al. | ....... 702/179 |
| 6,115,654 A | * 9/2000 | Eid et al. | ...................... 701/34 |

* cited by examiner

*Primary Examiner*—William A. Cuchlinski, Jr.
*Assistant Examiner*—Olga Hernandez
(74) *Attorney, Agent, or Firm*—Michael Best & Friedrich LLP (57) ABSTRACT

A system for displaying the status of accessory systems is claimed. At least one sensor monitors the status of at least one accessory system. A transmitter located in proximity of the sensor transmits status information from the sensor to a receiver. The receiver is located remotely from the sensor and the transmitter. The receiver processes the status information and transmits the status information to a visual display.

12 Claims, 6 Drawing Sheets

MARINE ACCESSORY SYSTEMS

BACKGROUND

This invention relates to monitoring systems. More particularly, the invention relates to a remote monitoring system having a centralized visual display of the status of various accessories or systems in a marine environment.

A boat has many independent accessory systems for effecting the basic operational and environmental functions of the boat. Typically, such accessory systems are located on various places on the boat that may be difficult to physically access or monitor, especially while attempting to pilot the boat at the same time. For example, accessory systems related to engine operating parameters, such as battery level, fuel level, oil level, oil pressure, and engine temperature are usually located in or around the engine. Accessory systems related to environment control, parameters such as state room temperature, potable water tank level and gray water tank level are usually located proximate to their respective systems, which, in turn, may be located anywhere on the boat.

Some have attempted to solve the problem of monitoring such systems by hard wiring accessory system monitors or sensors to a centralized display. However, having hard-wired connections to connect accessory systems to a centralized display requires the installation of cabling conduits throughout the vessel. Further, connecting multiple accessory systems to a centralized display is time consuming and expensive. Moreover, the wires are often exposed to severe weather and seawater. Such harsh elements provide a corrosive environment that shortens the life and decreases the reliability of such systems.

SUMMARY OF THE INVENTION

Accordingly, the invention provides a system for monitoring the status of various accessories, the monitoring system having a visual display of the status of accessory systems without physically having to access the various systems. As opposed to existing monitoring systems, the present invention uses wireless communication between various sensors of accessory systems and a centralized display.

At least one sensor monitors the status of at least one accessory system. A transmitter is connected to the sensor and transmits status information from the sensor to a receiver. The receiver is located remotely from the accessory system and receives the transmitted status information from the sensor. The receiver processes the information received from the sensor and transmits the information to a visual display.

The principal advantage of the invention is to provide a remote accessory monitoring system having a centralized display utilizing wireless communication.

Another advantage of the invention is to provide a centralized display that is easily accessible to the operation of the marine vessel.

Another advantage of the invention is to provide a centralized display of accessory systems that is operable in a harsh environment.

Other features and advantages of the invention will become apparent to those skilled in the art upon reviewing the following detailed description, claims and drawings.

Before one embodiment of the invention is explained in detail, it is to be understood that the invention is not limited in its application to the details of the construction and the arrangement of the components set forth in the following description or illustrated in the drawings. The invention is capable of other embodiments and may be carried out in various ways. Also, it is understood that the phraseology and terminology used herein is for the purpose of description and should not be regarded as limiting.

DETAILED DESCRIPTION OF THE PREFERRED EMBODIMENT

Figure 1:
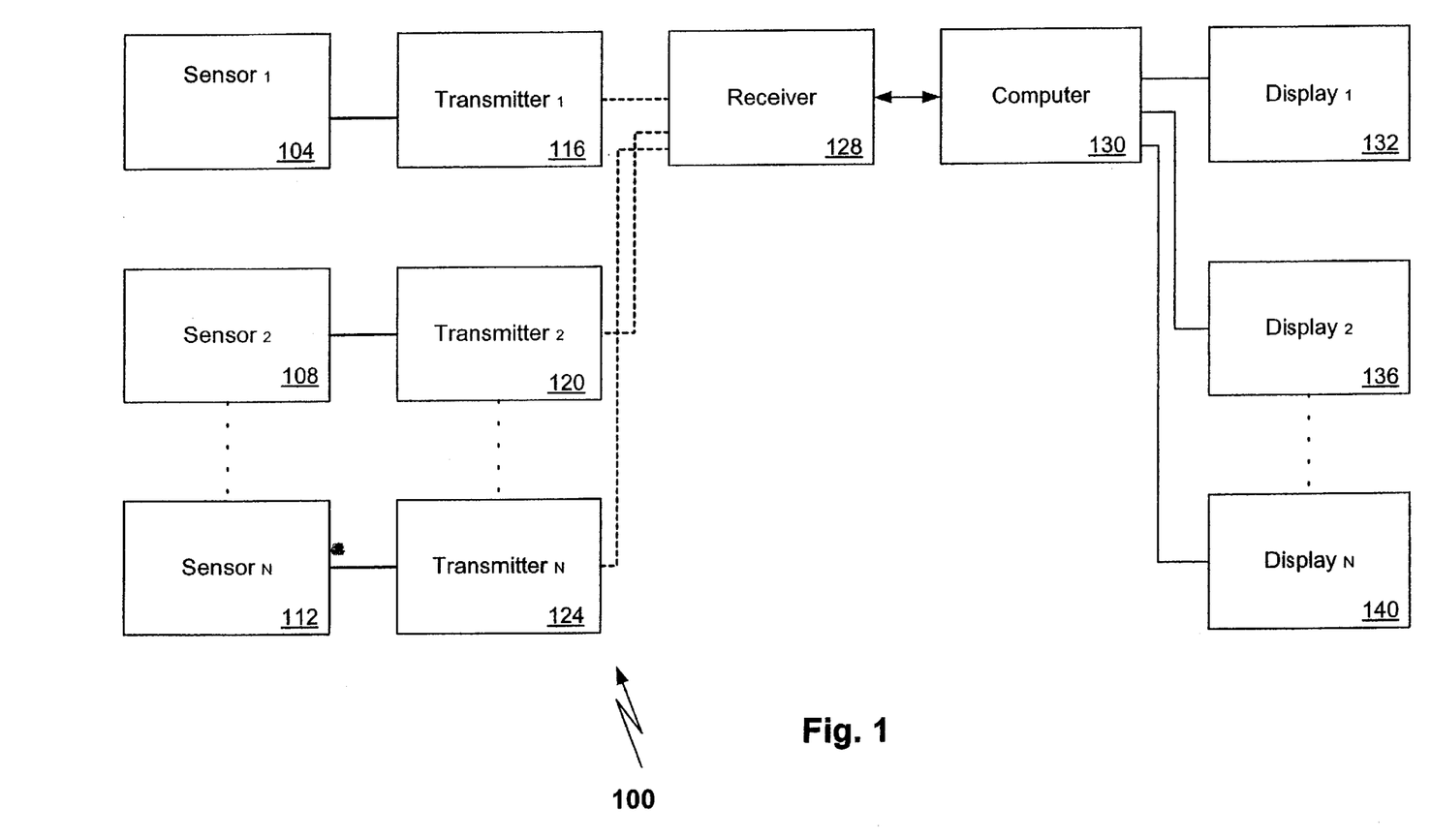
FIG. 1 is a block diagram of the system of the invention.

Illustrated in FIG. 1 is a block diagram of the accessory monitoring system 100 of the invention. Individual sensors, such as sensors 104, 108 and 112 monitor various individual accessory systems. The sensors can monitor any type of accessory system. Some representative accessory system categories are illustrated in FIGS. 2–6. The individual sensors 104, 108 and 112 capture status information from the accessory system that the sensor is monitoring.

Figure 2:
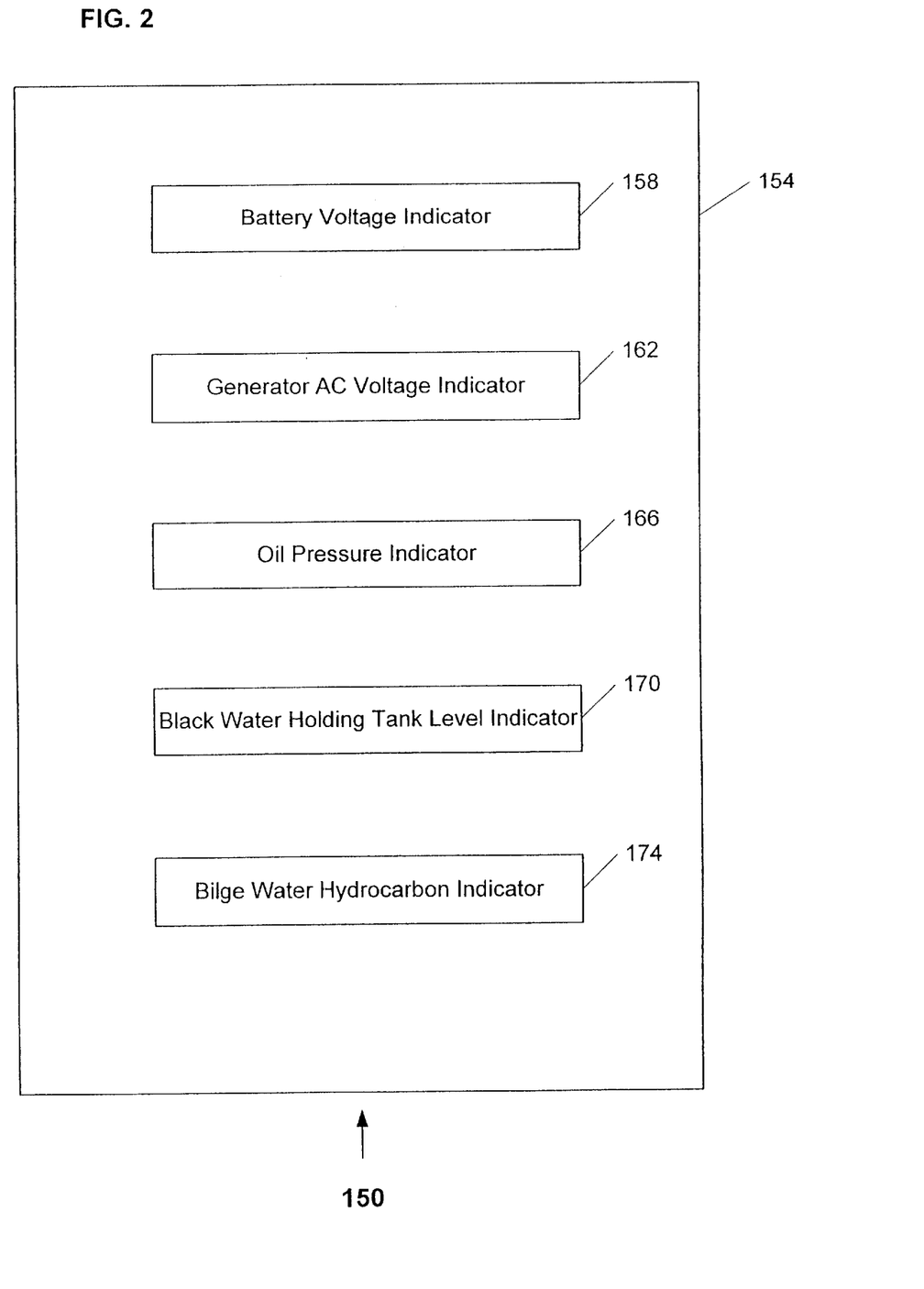
FIG. 2 is a block diagram of the basic systems monitor of the invention.

FIG. 2 illustrates the basic accessory systems 150. The selectable viewing screen 154 comprises a battery voltage indicator 158, a generator AC voltage indicator 162, an oil pressure indicator 166, a black water holding tank level indicator 170 and a bilge water hydrocarbon detector 174. Each viewing screen allows for programmable features, such as audible alarms and low battery indicators. Thus, for example, a fuel tank inlet alarm may sound when the fuel level passes a pre-programmed, threshold amount to avoid overfilling the tank and spilling fuel into a marina. Similarly, an alarm may sound off when a battery operated sensor is in danger of losing power or is no longer operable.

Figure 3:
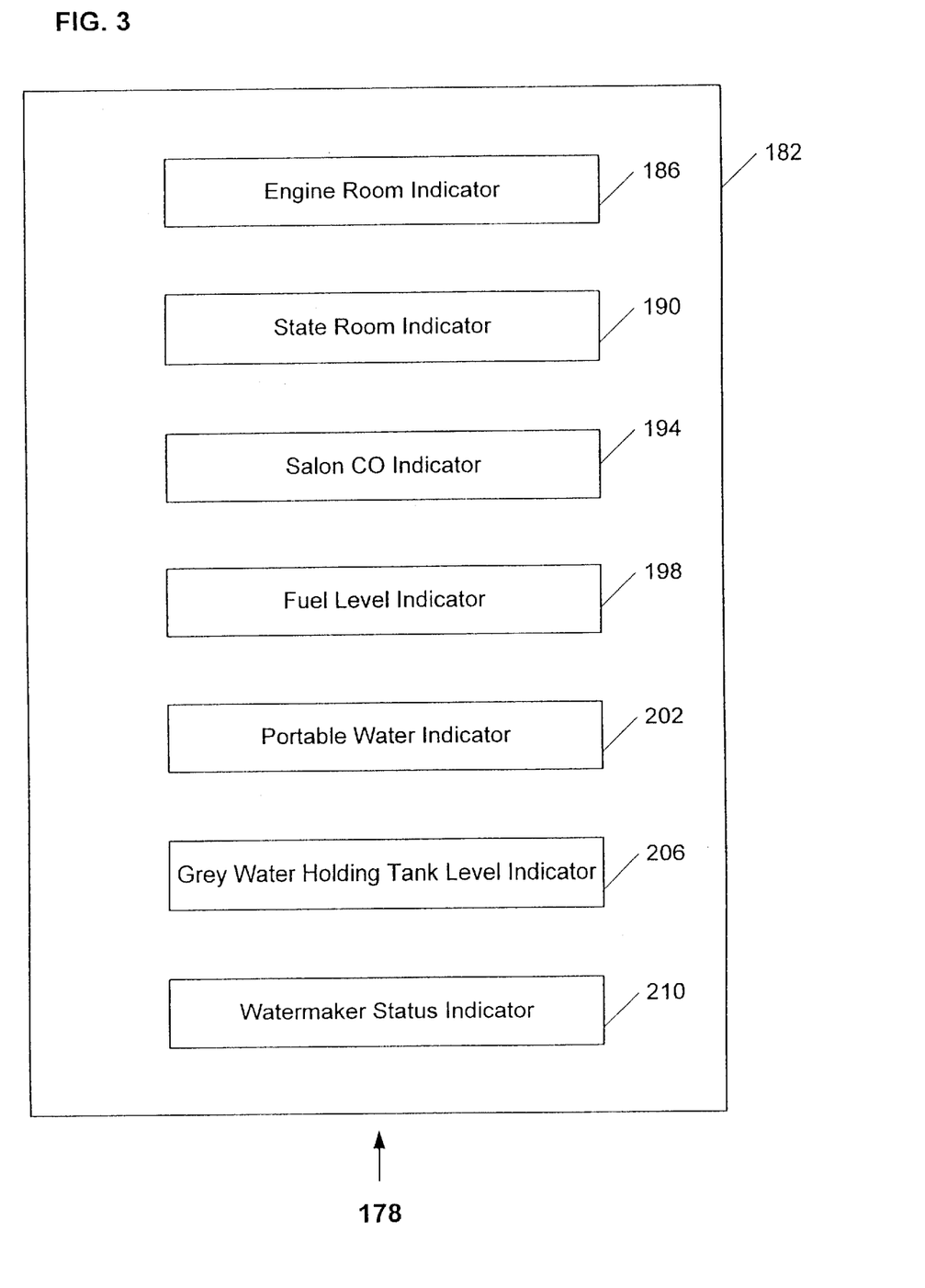
FIG. 3 is a block diagram of the environmental systems display of the invention.

FIG. 3 illustrates the environmental accessory systems 178. The environmental accessory systems 178 are displayed on an environmental systems viewing screen 182. The environmental viewing screen 182 comprises an engine room detector 186, a state room indicator 190, a salon CO detector 194, a fuel level sensor indicator 198, a potable water indicator 202, a gray water holding tank level indicator 206 and a water mark status indicator 210.

Figure 4:
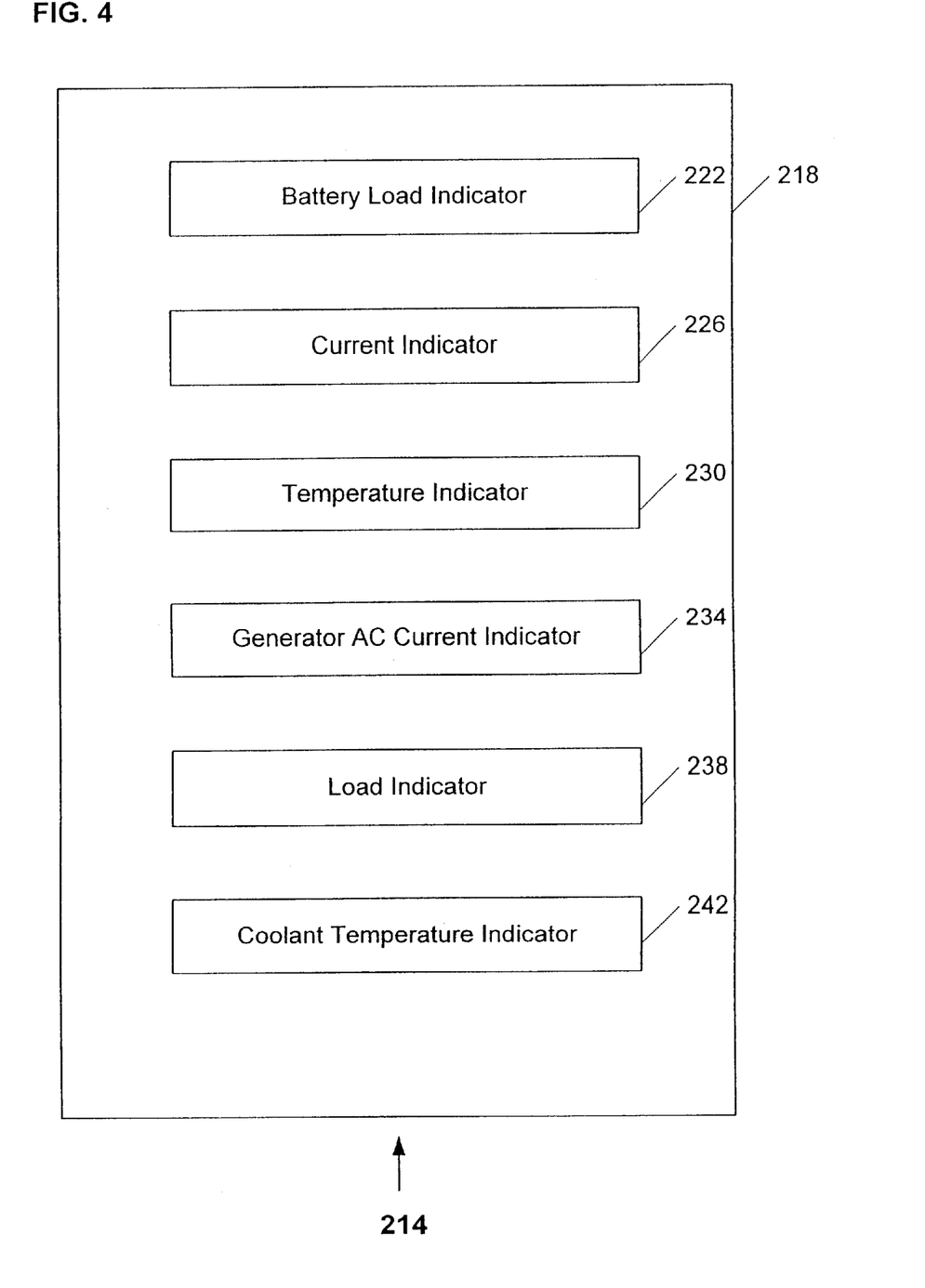
FIG. 4 is a block diagram of the electrical systems display of the invention.

FIG. 4 illustrates the electrical systems 214. The electrical systems 214 are displayed on an electrical systems viewing screen 218. The electrical systems viewing screen 218 comprises a battery load indicator 222, a battery current indicator 226, a battery temperature indicator 230, a generator AC current indicator 234, a load temperature indicator 238 and a coolant temperature indicator 242.

Figure 5:
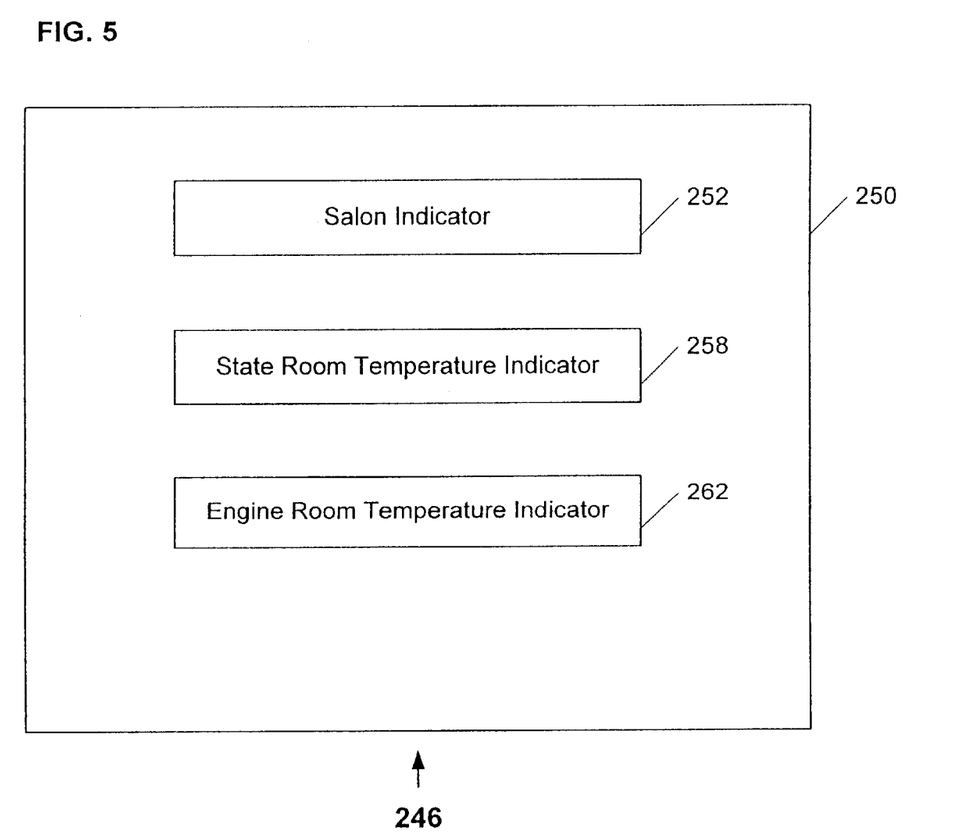
FIG. 5 is a block diagram of the climate control and comfort systems display of the invention.

FIG. 5 illustrates the climate control systems 246. The climate control systems 246 are displayed on a climate control systems viewing screen 250. The climate control system-viewing screen 250 comprises a salon indicator 252, a state room temperature indicator 258 and an engine room temperature indicator 262.

Referring back to FIG. 1, the accessory monitoring system 100 includes radio frequency (RF) transmitters 116, 120, and 124 connected to sensors 104, 108, and 112, respectively. Transmitters 116, 120, and 124 receive status information from the respective sensors, and transmit the status information to a centralized receiver 128. In a preferred embodiment, the transmitters 116, 120, and 124 transmit (i.e., broadcast) a low power radio frequency (RF) signal to the receiver 128. The receiver 128 receives the data transmission of status information from the various sensors. The status information is processed in a processor or computer 130, which then transmits the status information to a centralized display 132. As status information is received from the sensors 104, 108, and 112, the status information is periodically updated to the centralized display 132. In some cases, it may be desirable to transmit status information to a different display, or to more than one display, such as displays 136 and 140. The displays 132, 136, and 140 are mounted in easily accessible locations, such as the helm of a boat.

The display 132 is preferably a flat panel display that may be configured with selectable viewing screens for each of the major accessory system categories. Push buttons, soft keys, and/or a mouse driven cursor may allow the operator to navigate through the different viewing screens.

Figure 6:
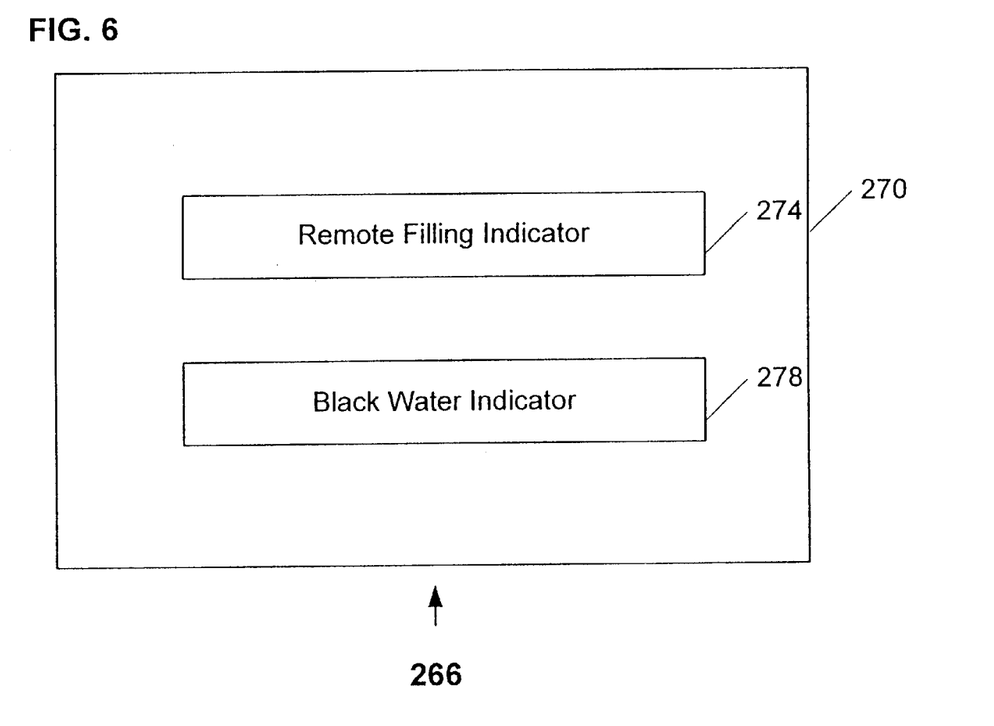
FIG. 6 is a block diagram of optional displays of the invention.

In some cases, it may not be desirable to have all accessory systems status information available on a single display. Also, it may be desirable to have status information of certain accessory systems available on multiple displays. Accordingly, FIG. 6 illustrates optional display systems 266. The optional display systems 266 are displayed on an optional display system-viewing screen 270. The optional display systems 266 may operate remotely from the main operating display 132. The optional display systems 266 may comprise a remote filling alarm and display 274 and a black water display and alarm system 278.

The computer 130 operates in two modes: a normal mode where the computer carries out the functions described above, and a learning or programming mode where the computer learns the identity of the sensors 104–112.

The sensor/transmitter units used in the present invention are uni-directional devices. That is, the sensor/transmitter units transmit data but are incapable of receiving data or commands from a controller such as the computer 130. Further, since the present invention employs wireless communication there is no direct connection from each sensor/transmitter unit to the receiver 128. These circumstances make it difficult for the receiver 128/computer 130 to determine which sensor/transmitter unit is "talking" to it.

The circumstances also make it difficult for the receiver 128/computer 130 to distinguish spurious signals from desired transmissions of the sensor/transmitter units.

Accordingly, transmissions from sensor/transmitter units are encoded before transmission. Once received by the receiver, the transmissions are decoded to ensure that they match previously stored codes. Preferably, each sensor 104–112 is assigned a pseudo-random code number of sufficient length to ensure that duplication of codes does not occur for a commercially reasonable number of monitoring systems. Each sensor 104–112 provides at least two transmission data packets depending on the mode of operation: normal mode or power up mode. In the normal mode, each sensor provides the pseudo-random code with each transmission of information. In the power up mode, each sensor provides a diagnostic signal or data packet with the identifying pseudo-random code. The computer 130 is programmed to recognize that receipt of a power up mode transmission packet indicates a failure or tamper condition with the associated sensor.

As the computer 130 receives information from the receiver 128, it stores the pseudo-random code associated with the transmission and compares it to codes received while the computer 130 was in the programming mode. The computer 130 then ignores any sensor transmissions that do not contain a code that matches those stored during programming. Using this technique it is possible for the computer 130 to learn the identity of the sensors 104–112 by placing the computer 130 in the programming mode, turning off each sensor, and then turning each sensor on.

As can be seen from the above, the present invention provides a wireless accessory monitoring system that provides information regarding various accessory systems. Many possible forms of the invention may be constructed based on the teachings set forth herein. Therefore, it should be understood that the invention is not confined to the particular construction and arrangement of the components illustrated and described, but embraces all forms encompassed by the following claims.

What is claimed is:

1. A method of displaying the status of accessory systems in a marine vessel, the method comprising the acts of:

providing a sensor/transmitter unit for monitoring at least one accessory system in the marine vessel;

providing a receiver, a computer, and a display;

connecting the sensor/transmitter unit and the receiver to the marine vessel;

storing a pseudo-random code within the sensor/transmitter unit;

teaching the computer the pseudo-random code;

sensing the status information of the accessory system with the sensor/transmitter unit;

wirelessly transmitting the status information and the pseudo-random code from the sensor/transmitter unit, thereby preventing the need of a hardwire connection in the marine vessel between the sensor/transmitter unit and the receiver;

receiving the status information and the pseudo-random code with the receiver;

validating the pseudo-random code;

processing the status information in the computer if the pseudo-random code is valid; and displaying the processed status information on the display.

2. The method as set forth in claim 1, wherein the act of displaying the status information further comprises the act of selecting a view screen.

3. A method as set forth in claim 1, and further comprising mounting the display in a helm of the marine vehicle.

4. A system for monitoring the status of accessory systems in a marine vessel, the system comprising:

at least one sensor positioned within the marine vessel to monitor the status of at least one accessory system of the marine vessel;

a unidirectional transmitter connected to the sensor for receiving status information from the sensor, the transmitter having a pseudo-random code and a diagnostic packet, and the transmitter being operable to wirelessly transmit the pseudo-random code and status information during a normal operations mode and to wirelessly transmit the pseudo-random code and the diagnostic data packet during a power-up mode;

a receiver positioned within the marine vessel remotely located from the sensor and the transmitter to receive the pseudo-random code, the transmitted status information, and the diagnostic data packet;

a computer coupled to the receiver, the computer being operable to learn the pseudo-random code and validate the identify of the transmitter based on the learned pseudo-random code; and at least one display connected to the receiver to visually display the status information.

5. The system as set forth in claim 4, wherein the display is configured having selectable viewing screens.

6. The system as set forth in claim 4, wherein the viewing screens are controlled by soft keys.

7. The system as set forth in claim 4, wherein the viewing screens are controlled by a cursor.

8. The system as set forth in claim 4, wherein the receiver and the controlled by a computer.

9. A system as set forth in claim 4, wherein the display is mounted in a helm of the marine vehicle.

10. The system as set forth in claim 4, wherein the accessory system is a basic systems monitor.

11. The system as set forth in claim 10, wherein the basic systems monitor further comprises a battery voltage indicator.

12. The system as set forth in claim 10, wherein the basic systems monitor further comprises a generator AC voltage indicator.

* * * * *

UNITED STATES PATENT AND TRADEMARK OFFICE
CERTIFICATE OF CORRECTION

PATENT NO.     : 6,415,209 B1            Page 1 of 1
DATED          : July 2, 2002
INVENTOR(S)    : Lawrence B. Reimer It is certified that error appears in the above-identified patent and that said Letters Patent is hereby corrected as shown below:

<u>Column 6,</u>
Line 2, insert -- display are -- before the word "controlled"

Signed and Sealed this

Twenty-sixth Day of August, 2003

JAMES E. ROGAN
*Director of the United States Patent and Trademark Office*